No. 798,737. PATENTED SEPT. 5, 1905.
F. W. LINDGREN & L. FAUST.
FRICTIONAL GEARING.
APPLICATION FILED NOV. 25, 1904.
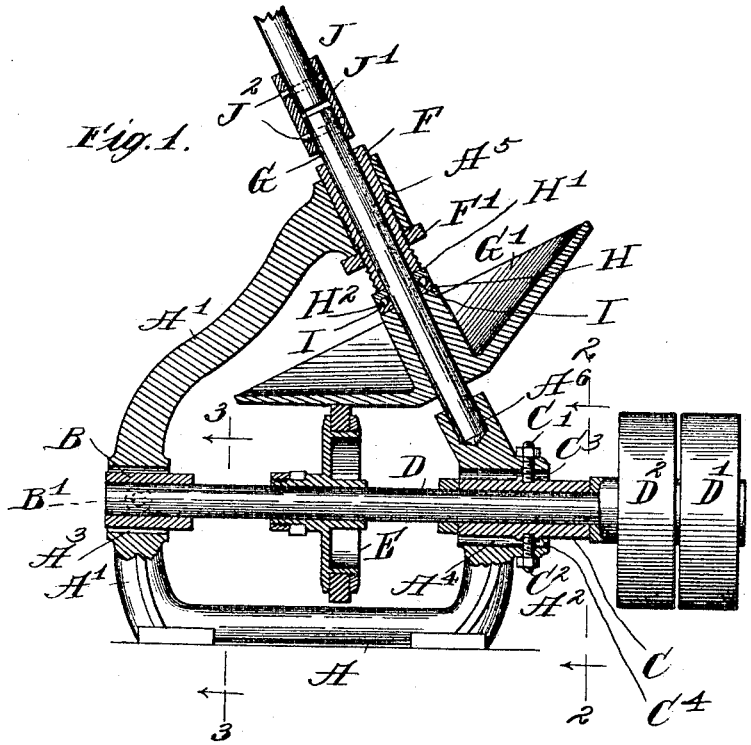
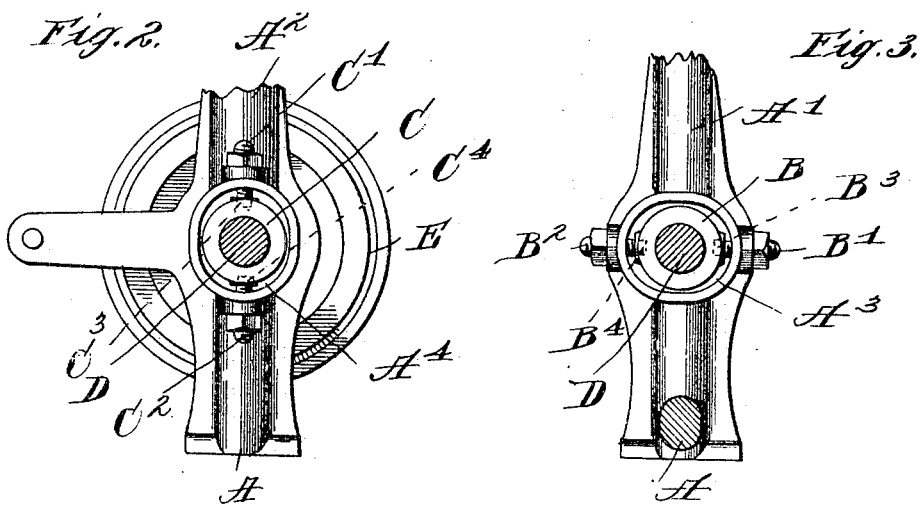
Witnesses:
Frank A. Ticknor.
Nellie E. Ennett.
Inventors:
Frank W. Lindgren,
Levin Faust,
By L. L. Morrison Atty

UNITED STATES PATENT OFFICE.

FRANK W. LINDGREN AND LEVIN FAUST, OF ROCKFORD, ILLINOIS.

FRICTIONAL GEARING.

No. 798,737.        Specification of Letters Patent.        Patented Sept. 5, 1905.

Application filed November 25, 1904. Serial No. 234,175.

*To all whom it may concern:*

Be it known that we, FRANK W. LINDGREN and LEVIN FAUST, citizens of the United States of America, residing at Rockford, in the county of Winnebago and State of Illinois, have invented certain new and useful Improvements in Frictional Gearing, of which the following is a specification.

The object of our invention is to provide means for mounting and regulating the friction of the friction-pulleys of drilling and other machines; and it consists of certain new and useful features of construction and combinations of parts especially devised to those ends, all as hereinafter fully described, and specifically pointed out in the claim appended hereto.

Referring to the accompanying drawings, which form a part of this specification, Figure 1 is a side elevation, in partial section, of the base of a drilling-machine embodying our invention. Fig. 2 is a section at the dotted line 2 2 in Fig. 1 of parts there shown. Fig. 3 is a section at the dotted line 3 3 in Fig. 1 of parts there shown.

Like letters of reference indicate corresponding parts throughout the several views.

A is the base of the drilling-machine frame and is provided with upwardly-extending arms $A'$ $A^2$, having concentric horizontal openings $A^3$ $A^4$ and an oblique opening $A^5$ therein and also having an oblique bearing $A^6$ concentric with the opening $A^5$ therein.

B is a tubular shaft-bearing, mounted horizontally in the opening $A^3$ in the arm $A'$ by means of horizontal opposite pivots $B'$ $B^2$, projecting into corresponding sockets $B^3$ $B^4$ in such bearing.

C is a tubular shaft-bearing mounted horizontally in the opening $A^4$ in the arm $A^2$ by means of vertical opposite pivots $C'$ $C^2$, projecting into sockets $C^3$ $C^4$ in such bearing.

The pivots $B'$ $B^2$ $C'$ $C^2$ are threaded and are also supported in correspondingly-threaded bearings in the parts $A'$ $A^2$, so that the shaft-bearings B C may be accurately alined with each other and nicely adjusted both laterally and vertically.

D is a shaft mounted in the pivotally-supported bearings B C.

$D'$ $D^2$ are respectively fast and loose pulleys on the shaft D.

E is a friction-pulley having spline connection with the shaft D in order that it may be freely slid thereon laterally and yet revolve therewith.

F is a sleeve having the middle and lower portions thereof threaded exteriorly and mounted in the bearing $A^5$ in the part $A'$, so that it may be slidably adjusted endwise therein.

$F'$ is a nut applied to and rotatable on the exterior of the sleeve F to adjust the same.

G is a shaft mounted obliquely in the sleeve F and bearing $A^6$ in the part $A^2$.

$G'$ is a cone friction-pulley fast mounted on the lower portion of the shaft G in such manner that any part of its periphery may be caused to engage frictionally with the preferably leather-covered periphery of the friction-pulley E.

H $H'$ are collars on the shaft G, having annular raceways $H^2$ in their adjacent faces and included between and contacting the lower end of the sleeve F and the upper end of the hub of the friction-pulley G.

I represents balls resting in the raceways in the collars H $H'$ to form ball-bearings therewith.

J is an extension of any desired length of the shaft G and is preferably connected therewith by means of a connecting-collar $J'$ and pins $J^2$. A bevel-gear (not shown) is usually fast mounted on the upper end portion of the shaft J and meshed with a bevel-gear (not shown) fast mounted usually on a vertical shaft. (Also not shown.)

The employment of shaft-bearings B C, mounted horizontally and vertically by means of the horizontal and vertical opposite pivots $B'$ $B^2$ $C'$ $C^2$ in the manner hereinbefore shown and described, renders it practicable to quickly and accurately aline and adjust such bearings and their shaft D.

By adjusting the sleeve F up and down in its bearing $A^5$ by means of the nut $F'$ the frictional contact between the pulleys E G may be nicely regulated.

Having fully described our invention, what we claim as new, and desire to secure by Letters Patent, is—

In mechanism of the class described, in combination, a supporting-frame having concentric horizontal openings $A^3$ $A^4$ and bearings $A^5$ and $A^6$ therein, a tubular shaft-bearing B, mounted horizontally in the opening $A^3$ in the frame, by means of horizontal opposite pivots $B'$ $B^2$ projecting into corresponding sockets $B^3$ $B^4$ in such bearing, a tubular shaft-bearing C, mounted horizontally in the opening $A^4$ in the frame, by means of vertical opposite pivots $C'$ $C^2$ projecting into corresponding sockets $C^3$ $C^4$ in such bearing, a shaft D mounted in the pivotally-supported bearings B C, a friction-pulley E having spline connection with the shaft D, a sleeve F having its lower portion threaded exteriorly and mounted in the bearing $A^5$, in the supporting-frame, so that it may be slidably adjusted endwise therein, a nut $F'$ applied to and rotatable on the exterior of the sleeve, a shaft G mounted obliquely in the sleeve F and bearing $A^6$ in the supporting-frame, a cone friction-pulley $G'$ fast mounted on the shaft G, in such manner as to frictionally engage the periphery of the pulley E, on the shaft D, collars H $H'$, on the shaft G, having annular raceways $H^2$ in their adjacent faces and included between and contacting the lower end of the sleeve F and upper end of the hub of the pulley G, and balls I resting in the raceways in the collars to form ball-bearings therewith, substantially as and for the purpose specified.

In testimony whereof we have signed our names to this specification in the presence of two subscribing witnesses.

FRANK W. LINDGREN.
LEVIN FAUST.

Witnesses:
L. L. MORRISON,
NELLIE E. ENNETT.